United States Patent [19]

Schuetze

[11] Patent Number: 5,968,117
[45] Date of Patent: Oct. 19, 1999

[54] DEVICE AND SYSTEM TO FACILITATE ACCESSING ELECTRONIC MAIL FROM REMOTE USER-INTERFACE DEVICES

[75] Inventor: Robert Charles Schuetze, Aurora, Canada

[73] Assignee: Aurora Communications Exchange Ltd., Thornhill, Canada

[21] Appl. No.: 09/009,243

[22] Filed: Jan. 20, 1998

[51] Int. Cl.[6] .................................................. G06F 15/167
[52] U.S. Cl. .......................................................... 709/206
[58] Field of Search ...................... 364/DIG. 1 MS File, 364/DIG. 2 MS File; 709/206, 200, 203, 202, 214, 217

[56] References Cited

U.S. PATENT DOCUMENTS 5,822,526  10/1998  Waskiewicz ............................. 709/206

*Primary Examiner*—Robert B. Harrell
*Attorney, Agent, or Firm*—Riches McKenzie & Herbert; Jeffrey Pervanas

[57] ABSTRACT

A device, system and process for accessing electronic mail from remotely located user-interface devices is disclosed. The users at the user-interface devices enter the electronic mail address and password, if any, for retrieval of electronic mail from the user's mailbox. The device locates one host computer from a plurality of host computers which contains the mailbox corresponding to the electronic mail address. The device then retrieves the electronic mail and transmits the electronic mail to the user-interface device. For large electronic mail messages, the device commences transmission of the electronic mail to the user-interface device while still receiving the electronic mail from the host computer. The device comprises a memory unit which stores domain names and the corresponding host computers which contain the mailbox for those domain names. Domain names not located in the memory unit can be searched through name servers to locate the host computer containing the mailbox.

20 Claims, 2 Drawing Sheets

DEVICE AND SYSTEM TO FACILITATE ACCESSING ELECTRONIC MAIL FROM REMOTE USER-INTERFACE DEVICES

FIELD OF THE INVENTION

This invention relates to a device, system and process for accessing electronic mail from remotely located user-interface devices. More particularly, the present invention relates to a generic common data transfer device to facilitate accessing electronic mail stored in a plurality of host computers from a plurality of user-interface devices.

BACKGROUND OF THE INVENTION

Computer mail systems, also known as electronic mail systems, allow one user to send messages by electronic transmission to mailboxes of other users. In general, the electronic mail is stored in an electronic virtual mailbox, contained on a host computer. The virtual mailbox can be a memory location or a disk storage area on a host computer.

The host computer can be operated by electronic mail providers, such as America-On-Line (AOL), Prodigy or CompuServe. Each electronic mail provider generally uses different proprietary systems to receive, store and retrieve electronic mail. In addition, the host computer can also be a private computer of a particular company for use by the employees of that company. The private computer of each particular company could use different electronic mail systems.

Most users access their electronic mail from their personal computer, whether it is located at their office, for corporate users, or at their residence, for personal users. In this case, the personal computer of the user will be configured and have the appropriate format to allow transfer of data, namely receiving and transmitting information including electronic mail to and from the host computer which contains the user's mailbox.

However, when the user is away from their personal computer, it is difficult, if not impossible, to retrieve electronic mail from their mailbox. One solution would be for the user to have a lap-top or a portable computer with them at all times to facilitate accessing electronic mail when away from their personal computers. However, it is not practical for many people to have a lap-top or personal computer with them at all times solely for retrieving their electronic mail.

Another solution would be for electronic mail providers to have remotely located user-interface devices, such as kiosks. In this way, users that subscribe to a particular electronic mail provider can access electronic mail from these remotely located user-interface devices.

A disadvantage of these user-interface devices is that they are source dependent in that a user-interface device which has been configured and has the formatting and protocol information for accessing electronic mail from AOL cannot access electronic mail from host computers of other electronic mail providers, such as Prodigy. It is not cost-effective to configure and provide formatting, protocol and configuration information at each user-interface device for accessing mailboxes contained on two or more host computers. This problem is compounded when the large number of private organizations having internal electronic mail systems for their employees is considered.

Furthermore, there is limited space at the user-interface devices on which to store formatting, protocol and configuration information to access mailboxes contained on each of the different host computers. In addition, there are potential incapability problems between the various mail systems which could prevent one user-interface device having the ability to access electronic mail from a plurality of host computers.

In addition, some user-interface devices, such as telephones having electronic mail capability, simply do not have the storage space to store the information necessary to receive electronic mail stored in mailboxes contained on a plurality of host computers.

SUMMARY OF THE INVENTION

Accordingly, it is an object of this invention to at least partially overcome the disadvantages of the prior art. Also, it is an object of this invention to provide an improved type of device, system and process to facilitate accessing electronic mail contained in a plurality of host computers from one or more remotely located user-interface devices.

Accordingly, in one of its objects, this invention resides in a data transfer device for transferring electronic mail stored in mailboxes in a plurality of host computers to a remotely located user-interface device, said data transfer device comprising: a first communication means for transmitting and receiving information from the user-interface device; a second communication means for transmitting and receiving information from each one of the plurality of host computers; mailbox locating means for locating, in said plurality of host computers, a mailbox corresponding to an electronic mail address; wherein the first communication means receives a received address from the user-interface device and sends the received address to the mailbox locating means to locate a located mailbox corresponding to the received address; wherein the second communication means transmits a request to receive electronic mail stored in the located mailbox to a host computer which contains the located mailbox and receives the electronic mail stored in the located mailbox in response to the request; and wherein the second communication means sends the electronic mail to the first communication means for transmission to the user-interface device.

In a further aspect, the present invention resides in a process for transferring electronic mail from mailboxes in a plurality of host computers to a remotely located user-interface device, said process comprising the steps of: (a) receiving from the remotely located user-interface device a received address; (b) locating, in said plurality of host computers, a located mailbox corresponding to the received address; (c) transmitting the received address to a host computer which contains the located mailbox with a request to receive the electronic mail stored in the located mailbox; (d) receiving the electronic mail stored in the located mailbox from the host computer; and (e) transmitting the electronic mail stored in the located mailbox to the user-interface device.

In a still further aspect, the present invention resides in a system for communicating electronic mail, said electronic mail being stored in mailboxes contained in one of a plurality of host computers, each host computer permitting access to a mailbox in response to an address and a verification code associated with the mailbox, said system comprising: a plurality of user-interface devices remotely located from the plurality of host computers, each user-interface device having means for inputting and transmitting the address and the verification code associated with the mailbox; a data transfer device comprising: a first communication means for transmitting and receiving information from each one of the plurality of user-interface devices; a second communication means for transmitting and receiving information from each one of the plurality of host computers; mailbox locating means for locating, in said plurality of host computers, the mailbox corresponding to the address; wherein when one of the user-interface devices transmits the address and the verification code, the first communication means receives the address and the verification code and sends the address to the mailbox locating means to locate a host computer of the plurality of host computers which contains the mailbox associated with the address; wherein the second communication means transmits the verification code and the address to the host computer with a request to receive electronic mail stored in the mailbox and receives the electronic mail stored in the mailbox in response thereto; and wherein the first communication means sends the electronic mail to the user-interface device which transmitted the address and the verification code.

Accordingly, the present invention provides a device, system and process to facilitate accessing electronic mail contained on a plurality of host computers from one or more remotely located user-interface devices. One advantage of the present invention is that each user-interface device need not contain the formatting, protocol and configuration information to transmit and receive information to each of the plurality of host computers. Rather, each user-interface device need only have the capability to transmit and receive information to and from the data transfer device. This decreases the cost to create each of the user-interface devices. This also decreases the cost to maintain each of the user-interface devices because each device need not be updated with changes in the format or configuration of the host computers.

A further advantage of the present invention is that the user-interface devices are not limited to a small number or fixed number of host computers. In other words, should a user of the user-interface device wish to access electronic mail stored on a host computer not previously accessed through the user-interface device, the data transfer device can obtain the required information regarding the new host computer to allow the data transfer device to access electronic mail from the new host computer.

A further advantage of the present invention is that the device can locate the host computer containing the mailbox from the electronic mail address only. In other words, the user need not know the specific host computer which contains the mailbox. This is of assistance in many cases because electronic mail providers, such as AOL, may contain virtual mailboxes for users under an electronic mail address other than "AOL.com", often referred to as an "alias". Therefore, the user need not know the identity of the electronic mail provider to access the electronic mail. All the user requires is their electronic mail address and verification information, such as the password, to gain access to the mailbox. This also allows users to easily change electronic mail providers.

A further advantage of the present invention is that, for large electronic mail messages, the data transfer device provides cachability to allow a user to begin receiving a first batch of the electronic mail while a second batch is still being downloaded from the host computer.

A further advantage of the present invention is that the data transfer device allows the user to send electronic mail from the remotely located user-interface devices through the data transfer device. In this way, a user-interface device can send electronic mail without accessing the host computer but still showing the user's electronic mail address as the source of the electronic mail.

A still further advantage of the present invention is that the data transfer device is device-independent in that a plurality of different types of user-interface devices, having different types of formatting, can be accessed by the same data transfer device. A conversion program can be used to convert electronic mail received from the host computer to a format used by the user-interface device.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
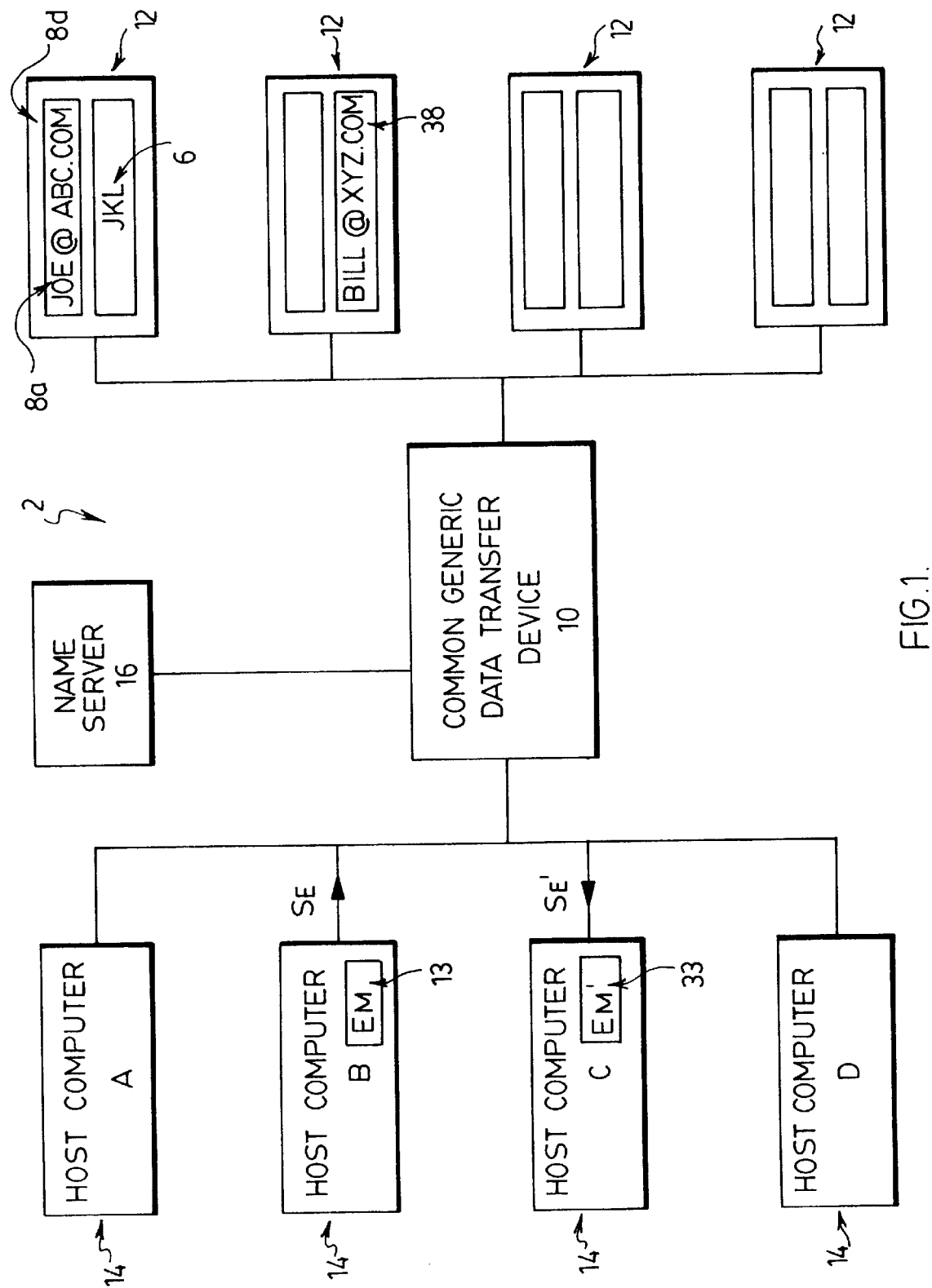
FIG. 1 shows a schematic drawing of a system comprising the device according to one embodiment of the present invention.

FIG. 1 shows a system, marked generally by reference numeral 2, for communicating electronic mail $E_M$ according to one embodiment of the present invention. The electronic mail $E_M$ can be stored in mailboxes 13 contained in one of a plurality of host computers 14. A user can access the electronic mail $E_M$ contained in a host computer 14 by sending a request to the host computer 14 within which mailbox 13 is contained that the mailbox 13 be opened and the electronic mail $E_M$ retrieved. In most cases, the mailbox 13 is equipped with password protection such that the user must send the appropriate verification code 6, such as a password, to the host computer 14 in order to retrieve the electronic mail $E_M$. At that time, the host computer 14 will send electronic signals $S_E$ corresponding to the electronic mail $E_M$ stored in the mailbox 13.

In general, a user can access electronic mail $E_M$ through a user-interface device, such as a personal computer. In order to facilitate user access to electronic mail $E_M$, the system 2 comprises a plurality of user-interface devices 12. The user-interface device 12 can be a private device which is used by a restricted group of users to access their electronic mail $E_M$. In addition, the user-interface devices 12 can be public devices such that the user-interface devices 12 can be used by any number of users for retrieving or sending electronic mail $E_M$. In the latter case, the user-interface devices 12 would need to have formatting, protocol and configuration information to access electronic mail $E_M$ at any one of the plurality of host computers 14, which are labelled in FIG. 1 as A, B, C and D.

In order to avoid each user-interface device 12 having the formatting, protocol and configuration information for each one of the potential host computers 14 which a user at the user-interface devices 12 may wish to access, the system 2 comprises a common generic data transfer device 10. The data transfer device 10 can communicate with each of the plurality of user-interface devices 12 and each of the plurality of host computers 14 in order to transfer data between the various elements.

Figure 2:
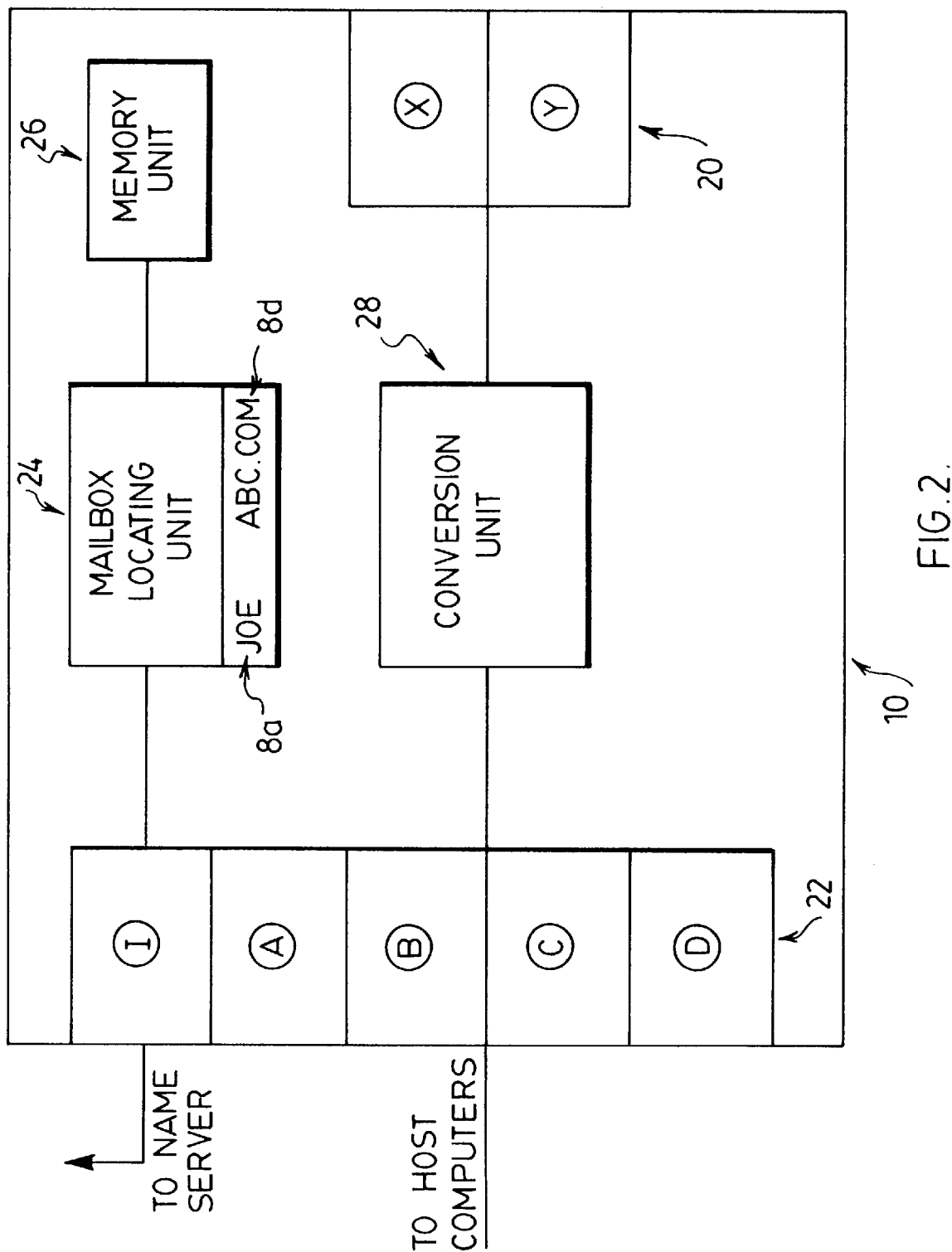
FIG. 2 shows a schematic drawing of the data transfer device according to one embodiment of the present invention.

FIG. 2 shows a schematic drawing of the data transfer device 10. As shown in FIG. 2, the data transfer device 10 comprises a first communication interface 20 and a second communication interface 22.

The first communication interface 20 transmits and receives information from each one of the plurality of user-interface devices 12. The first communication interface 20 can comprise formatting, protocol and configuration information shown generally by symbols X and Y in FIG. 2, for transmitting and receiving information to and from each of the user-interface devices 12. Likewise, the second communication interface 22 transmits and receives information from each one of the plurality of host computers 14. The second communication interface 22 can comprise formatting, protocol and configuration information, represented generally by symbols A, B, C and D in FIG. 2, for transmitting and receiving information to and from each one of the plurality of host computers 14.

During operation, the data transfer device 10 will receive an electronic mail address 8, for example "JOE@ABC.COM" shown in FIG. 1, from one of the user-interface devices 12. In general, the address 8 will be accompanied by a verification code 6, also referred to as a password, for example the letters "JKL" shown in FIG. 1. The verification code 6 is provided to access the mailbox 13 identified by the address 8.

Upon receipt of the address 8, the data transfer device 10 determines which one of the plurality of host computers 14 contains the mailbox 13 corresponding to the received address 8. To accomplish this, the data transfer device 10 comprises a mailbox locating unit 24. The mailbox locating unit 24 locates the mailbox 13 corresponding to the received address 8 by parsing the received address 8 into a domain portion 8d and a user portion 8u, as shown in FIG. 2. The mailbox locating unit 24 then determines the host computer 14 which contains the mailbox 13 corresponding to the address 8 from the domain portion 8d of the address 8.

In a preferred embodiment, the data transfer device 10 comprises a memory unit 26 for storing information. The memory unit 26 can store information regarding a plurality of domain portions 8d and the corresponding host computer 14 which contains the mailbox 13 of each of the plurality of domain portions 8d. In this way, the mailbox locating unit 24 can search the memory unit 26 for the domain portion 8d of the received address 8. If the memory unit 26 has information regarding the domain portion 8d of the received address 8, the mailbox locating unit 24 can determine the host computer 14 which contains the mailbox 13 from the information stored in the memory unit 26. For example, if the memory unit 26 has information regarding the domain portion 8d, namely the domain "ABC.COM", the mailbox locating unit 24 would be able to determine which host computer 14, for example host computer B in the example in FIG. 2, contains the mailbox 13 corresponding to the received address 8.

If the memory unit 26 does not have information regarding the domain portion 8d of the received address 8, the mailbox locating unit 24 determines which one of the plurality of host computers 14 contains the mailbox 13 by transmitting the domain portion 8d of the received address 8 to a name server 16. The name server 16 is a domain name server which assists users to identify domains on the Internet. A name server can be an Internet host computer running software capable of processing domain name service requests. The mailbox locating unit 24 transmits, such as through the second communication interface 22, to the name server 16 the domain portion 8d of the received address 8 and a request to identify the host computer 14 for the domain portion 8d. The name server 16 responds to such a request by sending to the data transfer device 10 information regarding the identity of the host computer 14 responsible for the domain corresponding to domain portion 8d. In this way, the mailbox locating unit 24 identifies the host computer 14 which contains mailbox 13 corresponding to the address 8.

In a preferred embodiment, the second communication interface 22 is used by the mailbox locating unit 24 to transmit and receive information to and from the name server 16. To accomplish this, the second communication interface 22 comprises formatting and protocol information, shown generally by symbol I, for communicating with the name server 16. As the name server 16 will generally be accessed through the Internet, protocol and formatting I will correspond to the protocol and formatting used to communicate over the Internet, such as Hyper Text Transfer Protocol (HTTP). once the mailbox locating unit 24 has identified the host computer 14 which contains the mailbox 13 corresponding to the received address 8, the received address 8 and the verification code 6 are sent to the second communication interface 22. The second communication interface 22 transmits the received address 8 and the verification code 6 with a request to open the mailbox 13 and retrieve the electronic mail $E_M$ stored therein. In order to send this information to the host computer 14, the information must be converted to a format and sent in a protocol which can be understood by the host computer 14 which contains the mailbox 13. The host computer 14 will then send electronic signals $S_E$ corresponding to the electronic mail $E_M$ stored in the mailbox 13 in response to the request. The second communication interface 22 receives the electronic mail $E_M$ and sends the electronic mail $E_M$ to the first communication interface 20. The first communication interface 20 then transmits the electronic mail $E_M$ to the user-interface device 12 which originally sent the address 8 and the verification code 6 to the data transfer device 10.

The data transfer device 10 comprises a conversion unit 28 to convert the address 8 and the verification code 6 received by the first communication interface 20 from one of a first plurality of formats, such as formats X and Y used by the user-interface devices 12, to one of a second plurality of formats, such as A, B, C and D, used by the plurality of host computers 14. In this way, information received from the user-interface devices 12 can be converted to a format which can be used and understood by the appropriate host computer 14. Likewise, information received by the data transfer device 10 from the host computers 14 by the second communication interface 22, such as the electronic signals $S_E$ corresponding to the electronic mail $E_M$, can be converted by the conversion unit 28 to a format which can be used by the user-interface device 12 for which the electronic mail $E_M$ is destined.

In a preferred embodiment, the conversion unit 28 comprises a standard format and protocol, such Post Office Protocol 3 (POP3), and converts information received by the second communication interface 22 in any one of the second plurality of formats A to D used by the host computers 14 to the standard format and protocol. Likewise, the conversion unit 28 can convert information from the standard format to any one of the plurality of formats X, Y used by the user-interface devices 12. This increases the efficiency of the data transfer device 10 because the conversion unit 28 need only convert information from the formats and protocols used by the user-interface devices 12 and the host computers 14 to the standard format, rather than requiring the conversion unit 28 to convert information from each one of the formats and protocols of the host computers 14 to each one of the formats and protocols of the user-interface devices 12. Information is sent between the various components of the data transfer device 10 in the standard format.

In some cases, the second communication interface 22 will not be able to receive the electronic mail $E_M$ stored in the mailbox 13 from the host computer 14. This may occur for a number of reasons. For example, the second communication interface 22 may be attempting to receive the electronic signals $S_E$ corresponding to the electronic mail $E_M$ using an incorrect format or protocol. In addition, even if the second communication interface 22 has the correct format and protocol, the second communication interface 22 may not be properly configured to receive the electronic signals $S_E$. In this event, the second communication interface 22 can request that the host computer 14 which is sending the electronic signals $S_E$ identify the proper format and protocol being used by the host computer 14. In addition, the second communication interface 22 can ask for and receive from the host computer 14 configuration information such that the data transfer device 10 can configure the second communication interface 22 to be able to receive the electronic mail $E_M$, represented by the electronic signals $S_E$ stored in the mailbox 13.

Therefore, if the second communication interface 22 encounters difficulties in receiving the electronic signals $S_E$, the second communication interface 22 will attempt to receive information, including information regarding the format, protocol and configuration, which the second communication interface 22 requires to be able to receive the electronic signals $S_E$. In a preferred embodiment, the data transfer device 10 requests and receives format, protocol and configuration information from the host computer 14 each time electronic mail $E_M$ is to be retrieved or sent to the host computer 14. In this way, the data transfer device 10 updates the formatting, protocol and configuration information for a host computer 14 each time information is sent or retrieved.

In some cases, the electronic mail $E_M$ will be quite large, requiring several seconds, and possibly minutes, to transfer the entire electronic mail $E_M$ message. In order to keep the downtime experienced by the user-interface device 12 to a minimum, the data transfer device 10 can commence transmitting the electronic mail $E_M$ to the user-interface device 12 through the first communication interface 20 while the data transfer device 10 is still receiving the electronic mail $E_M$ from the second communication interface 22. In other words, the data transfer device 10 can commence sending batches of the electronic mail $E_M$ to the user-interface device 12 before the data transfer device 10 has received all of the electronic mail $E_M$ from the host computer 14. This decreases the perceived delay by the user in retrieving electronic mail $E_M$.

In addition to retrieving electronic mail $E_M$ from the user-interface devices 12, it is possible for a user to send electronic mail $E_M'$ to other users. A user can do this by entering a destination address 38, for example "BILL@XYZ.COM" shown in FIG. 1, to which the electronic mail $E_M'$ is destined as well as the message and the user's own address 8. This information is sent from the user-interface device 12 to the data transfer device 10 and received by the first communication interface 20. The first communication interface 20 of the data transfer device 10 sends this information to the second communication interface 22 for transmission to the destination address 38. The second communication interface 22 then transmits the electronic mail $E_M'$ to the host computer 14 containing the destination mailbox 33 corresponding to the destination address 38.

The data transfer device 10 determines the host computer 14 containing the destination mailbox 33 by using the mailbox locating unit 24 in a manner similar to that discussed above used to locate the mailbox 13 corresponding to the user's address 8. The second communication interface 22 then sends electronic signals $S_E'$ representing the electronic mail $E_M'$ to the host computer 14 containing the destination mailbox 33. The electronic mail $E_M'$ sent to the destination mailbox 33 will show the user's address 8. In this way, the electronic mail $E_M'$ will indicate that it was sent from the user's address 8, and not from another address or from the data transfer device 10. The data transfer device 10 will then be transparent to both the recipient of the electronic mail $E_M'$ and to the user who sent the electronic mail $E_M'$.

It is understood that the user-interface device 12 can be any type of device. For example, the user-interface device can comprise a personal computer, a kiosk, or an advanced telephoned such as the Vista 350™ or the Vista 360™, or a wireless digital telephone and pagers. In addition, the plurality of user-interface devices 12 need not all be the same. In other words, the first communication interface 20 can convert the information to any type of format, shown generally by the symbols X and Y, used by any number of user-interface devices 12. In this way, the data transfer device 10 is user-interface device 12 independent. In one preferred embodiment, the first communication interface 20 can transmit and receive information in Hyper Text Markup Language (HTML), character formatting such as ASCII, Terminal Access Protocol (TAP) or TNPP. It is also understood that the device 10 can be connected to the user-interface devices 12 directly, such as through a private network, or through the Internet.

It is also understood that the plurality of host computers 14 can be any type of host computer which stores electronic mail $E_M$. For example, the host computers 14 can be well-known electronic mail providers, such as America-On-Line (AOL), Prodigy or CompuServe, as well as internal corporate mailboxes of large private or public organizations. In other words, the second communication interface 22 can comprise the formatting, protocol and configuration information to transmit and receive information from any one of the plurality of host computers 14. This formatting and protocol information is shown generally by the symbols A, B, C and D in FIG. 2 and can comprise Post Office Protocol Version 3 (POP3), Microsoft Application Programmers Interface (MAPI) and Vendor Independent Messaging (VIM) as well as proprietary formats and protocols used by AOL, Prodigy and CompuServe.

It is further understood that the device 10 can be any type of device that can perform the functions described above. For example, the device 10 can be a combination of distinct elements comprising the first and second communication interfaces 20 and 22, the mailbox locating unit 24, the conversion unit 28 and memory 26. In a preferred embodiment, the device 10 comprises a Unix server executing a "Mailreader" program.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A data transfer device for transferring electronic mail stored in mailboxes in a plurality of host computers to a remotely located user-interface device, said data transfer device comprising:

a first communication means for transmitting and receiving information from the user-interface device;

a second communication means for transmitting and receiving information from each one of the plurality of host computers;

mailbox locating means for locating, in said plurality of host computers, a mailbox corresponding to an electronic mail address;

wherein the first communication means receives a received address from the user-interface device and sends the received address to the mailbox locating means to locate a located mailbox corresponding to the received address;

wherein the second communication means transmits a request to receive electronic mail stored in the located mailbox to a host computer which contains the located mailbox and receives the electronic mail stored in the located mailbox in response to the request; and wherein the second communication means sends the electronic mail to the first communication means for transmission to the user-interface device.

2. The device as defined in claim 1 wherein the mailbox locating means locates the located mailbox corresponding to the received address by parsing the received address into a domain portion and a user portion and determining the host computer which contains the located mailbox from the domain portion of the received address.

3. The device as defined in claim 2 wherein the mailbox locating means determines the host computer which contains the mailbox from the domain portion of the received address by transmitting to a name server a request to identify the host computer for the domain portion and receiving from the name server information regarding the identity of the host computer.

4. The device as defined in claim 3 further comprising:

memory means for storing information regarding a plurality of domain portions and which host computer of the plurality of host computers contains mailboxes for each of the plurality of domain portions;

wherein the mailbox locating means determines the host computer by searching the memory means for the domain portion of the received address, and if the memory means has information regarding the domain portion of the received address, determining the host computer which contains the located mailbox from the information stored in the memory means, and if the memory means does not have information regarding the domain portion of the received address, transmitting to the name server the request to identify the host computer for the domain portion and receiving from the name server information regarding the host computer.

5. The device as defined in claim 1 further comprising:

conversion means for converting information from a plurality of formats to a first format, the plurality of formats being used by the plurality of host computers to send and receive information and the first format being used by the user-interface device to send and receive information;

wherein the first communication means transmits and receives information from the user-interface device in the first format and the second communication means transmits and receives information in the plurality of formats; and wherein the conversion means converts the electronic mail stored in the located mailbox from a format used by the host computer containing the located mailbox to the first format for transmission to the user-interface device.

6. The device as defined in claim 5 wherein if the second communication means cannot receive the electronic mail stored in the located mailbox from the host computer, the second communication means receives configuration information from the host computer and the device configures the second communication means according to the configuration information to receive the electronic mail stored in the located mailbox.

7. The device as defined in claim 6 wherein the first communication means can commence transmitting information regarding the electronic mail stored in the located mailbox while the second communication means is receiving the electronic mail from the host computer.

8. The device as defined in claim 1 wherein the first communication means transmits and receives information from a plurality of user-interface devices remotely located from the device.

9. The device as defined in claim 8 further comprising conversion means for converting information from a first plurality of formats to a second plurality of formats, the first plurality of formats corresponding to formats used by the plurality of user-interface devices and the second plurality of formats corresponding to formats used by the plurality of host computers;

wherein the first communication means transmits and receives information in the first plurality of formats and the second communication means transmits and receives information in the second plurality of formats; and wherein the conversion means converts the electronic mail stored in the located mailbox from the format of the host computer containing the located mailbox to the format used by the user-interface device which sent the received address.

10. The device as defined in claim 9 wherein the conversion means comprises a standard format such that the conversion means converts information received by the second communication means from one of the second plurality of formats used by the host computer to the standard format and then converts the information from the standard format to one of the first plurality of formats used by the user-interface device to which the information is being transmitted.

11. The device as defined in claim 1 wherein each of the plurality of host computers permits access to mailboxes in response to a verification code associated with each mailbox;

wherein the first communication means receives a received verification code with the received address from the user-interface device; and wherein the second communication means sends the received verification code to the host computer to receive the electronic mail stored in the located mailbox.

12. The device as defined in claim 1 wherein the first communication means receives an electronic message and a destination address from the user-interface device and sends the electronic message to the second communication means;

wherein the second communication means transmits the electronic message to the host computer containing the destination mailbox corresponding to the destination address; and wherein the electronic message indicates that the electronic message was sent from the received address.

13. A process for transferring electronic mail from mailboxes in a plurality of host computers to a remotely located user-interface device, said process comprising the steps of:

(a) receiving from the remotely located user-interface device a received address;

(b) locating, in said plurality of host computers, a located mailbox corresponding to the received address;

(c) transmitting the received address to a host computer which contains the located mailbox with a request to receive the electronic mail stored in the located mailbox;

(d) receiving the electronic mail stored in the located mailbox from the host computer; and (e) transmitting the electronic mail stored in the located mailbox to the user-interface device.

14. The process as defined in claim 13 wherein the user-interface device is one of a plurality of remotely located user-interface devices, each user-interface device using one of a first plurality of formats to transmit and receive information;

wherein each of the plurality of host computers uses one of a second plurality of formats to transmit and receive information;

the process further comprising the step of:

converting information received from the plurality of host computers to a standard format and then converting the information from the standard format to one of the first plurality of formats corresponding to the format used by the user-interface device which has transmitted the received address.

15. The process as defined in claim 14 wherein the step (d) further comprises the step of:

if the electronic mail stored in the located mailbox cannot be sent from the host computer, receiving configuration information from the host computer to permit reception of the electronic mail stored in the located mailbox, and then receiving the electronic mail stored in the located mailbox.

16. The process as defined in claim 13 wherein the step (e) of transmitting the electronic mail to the user-interface device can commence while the step (d) of receiving the electronic mail from the host computer is being executed.

17. The process as defined in claim 13 wherein each of the plurality of host computers permit access to mailboxes in response to a verification code associated with each mailbox;

wherein the step (a) further comprises the step of receiving a received verification code with the received address; and wherein the step (c) further comprises the step of transmitting to the host computer which contains the located mailbox the received verification code with the request to retrieve the electronic mail stored in the located mailbox.

18. The process as defined in claim 13 wherein the step (b) further comprises the steps of:

parsing the received address into a domain portion and a user portion; and determining the host computer which contains the located mailbox from the domain portion of the received address by sending a request to a name server to identify the host computer for the domain portion and receiving from the name server information regarding the identity of the host computer.

19. The process as defined in claim 13 wherein the step (b) further comprises the steps of:

searching a memory means, said memory means having stored information regarding a plurality of domain portions and which host computer of the plurality of host computers contains mailboxes for each of the plurality of domain portions, for the domain portion of the received address;

if the memory means has information regarding the host computer for the domain portion, determining the host computer which contains the located mailbox from the information stored in the memory means; and if the memory means does not have information regarding the host computer for the domain portion, determining the host computer by sending the request to the name server.

20. A system for communicating electronic mail, said electronic mail being stored in mailboxes contained in one of a plurality of host computers, each host computer permitting access to a mailbox in response to an address and a verification code associated with the mailbox, said system comprising:

a plurality of user-interface devices remotely located from the plurality of host computers, each user-interface device having means for inputting and transmitting the address and the verification code associated with the mailbox;

a data transfer device comprising:

a first communication means for transmitting and receiving information from each one of the plurality of user-interface devices;

a second communication means for transmitting and receiving information from each one of the plurality of host computers;

mailbox locating means for locating, in said plurality of host computers, the mailbox corresponding to the address;

wherein when one of the user-interface devices transmits the address and the verification code, the first communication means receives the address and the verification code and sends the address to the mailbox locating means to locate a host computer of the plurality of host computers which contains the mailbox associated with the address;

wherein the second communication means transmits the verification code and the address to the host computer with a request to receive electronic mail stored in the mailbox and receives the electronic mail stored in the mailbox in response thereto; and wherein the first communication means sends the electronic mail to the user-interface device which transmitted the address and the verification code.

* * * * *